2,960,408
DETOXIFICATION OF COTTONSEED MEAL

Robert S. Geister, Palos Heights, and Frank A. Norris, La Grange Highlands, Ill., assignors to Swift & Company, Chicago, Ill., a corporation of Illinois No Drawing. Filed Jan. 16, 1957, Ser. No. 634,433

8 Claims. (Cl. 99—9)

This invention relates to a non-toxic cottonseed meal of improved nutritive value and to a method of detoxifying and improving the nutritive content of cottonseed meal or the like. More particularly, the invention relates to a novel process wherein cottonseed meal, after oil extraction, is rendered by microorganism fermentation into a substantially non-toxic general animal food in which nutritional components have been substantially increased in number and in availability.

It has been long recognized that cottonseed meal, valuable as animal feed because of its high protein content, contains a toxic principal or principals which, if not removed, limit or preclude the use of the cottonseed for certain purposes such as for feeding swine, horses, or poultry. To the pigment gossypol, present in the pigment glands of cottonseed, is generally attributed responsibility for the toxic property of cottonseed. During the last four decades, various investigators have advanced methods for destroying, reducing or converting to an innoccuous form this toxic ingredient.

Prior art teaches three general methods for the detoxification of cottonseed. These are: (1) cooking in the presence of water in the temperature range of 203° F. to 290° F. for various times; (2) extracting the gossypol with solvents such as benzene, ethyl ether, alcohols, acetone or various aliphatic hydrocarbons; and (3) by the addition of various chemicals such as calcium chloride, alkalis, sulfur dioxide, aniline or ammonia.

Results of heating the cottonseed meal in the presence of moisture were quite variable and suffered an additional disadvantage in that as the heat treatment nullified the effect of the gossypol, it simultaneously thermally denatured a substantial portion of the protein and decreased the digestibility of the meal. Extraction of gossypol with the various aforementioned solvents has proved to be economically unfeasible, has encountered various operational difficulties in handling the process and has introduced a definite hazard due to the explosiveness of the solvents. The addition of chemicals has the disadvantage of introducing foreign materials as adulterants into the meal. While the introduction of aniline, for example, will reduce the gossypol content to a level of about .04%, it must be recognized that aniline itself is a highly toxic chemical and even minor amounts left in cottonseed meal would be expected to produce serious illness and/or death in any animals ingesting the meal.

The present invention obviates the disadvantages of the three principal methods taught by the previous art. By the use of this new method, the protein content of the meal will not be subjected to thermal denaturation and resultant loss of nutrient material. Since the commercial value of cottonseed cake as feed lies primarily in its 43% protein content, an improved method of detoxification affords a substantial gain both nutritionally and economically. The materials added to the cottonseed meal are non-toxic, will not create industrial hazards, and are themselves nutrient substances which would not be classified as "foreign."

Raw cottonseed meal also contains a large amount of cellulose or cellulosic material. The ordinary digestive juices of animals are incapable of converting cellulose into glucose sugar and, therefore, the former is largely unavailable as foodstuff to most animals. The present invention, by breaking down cellulose into glucose, offers a valuable addition to the above-mentioned high protein content of cottonseed meal.

It is an object of the invention to reduce the percent of gossypol in the cottonseed meal to an amount considered harmless to monogastric animals.

A further object of the invention is to reduce the temperature used in the prior art treatment of cottonseed, preventing denaturation of the protein.

Still another object of the invention is to provide for in vitro fermentation of cottonseed meal by rumen microorganisms wherein a detoxified product is produced which has a food value greater than the starting material and wherein the cellulosic content is hydrolyzed to sugars and other constituents readily utilized by all animals.

Since cattle, sheep and the like are not sensitive to the gossypol and may ingest large quantities of cottonseed meal over extended periods, and since other animals are sensitive to the toxic effects of gossypol, it is obvious that the cattle and sheep exert a particular digestive effect on cottonseed which either renders the gossypol non-toxic or destroys it as an entity. The fundamental gastro-intestinal difference between cattle, sheep and the like and other animals lies in the possession of a fermentation organ, extra stomach or rumen by the cattle and sheep. In this rumen an anaerobic fermentation process by microorganisms occurs which hydrolyzes cellulose and apparently renders the gossypol innocuous before it enters the true stomach. It was conceived, therefore, that an in vitro fermentation of cottonseed meal by the microorganisms from a rumen would render the cottonseed harmless and simultaneously change the cellulose to a more readily available nutrient form.

Generally, then, the present invention comprises essentially the discovery that rumen microorganisms when mixed with cottonseed meal in the proper manner will initiate a fermentation process which detoxifies gossypol and synthesizes vitamins, amino acids, carbohydrates and fatty acids. The cottonseed meal to be used may preferably have had the oil extracted in any manner known in the industry. The meal is moistened to the consistency of a slurry, rumen microorganisms numbered in the billions are innoculated into the slurry, a certain percentage of rumen fluid is added, a minute amount of a reducing agent such as cysteine hydrochloride or sodium-thioglycollate to induce anaerobic conditions may be added and the slurry is incubated for a number of hours. The incubated slurry may then be press dried in cake form or dried in some other manner in which the product is not subjected to a high temperature for prolonged periods of time.

More particularly, the rumen microorganisms used in this invention may be gathered from any of several sources: dehydrated commercial rumen inoculum, fresh whole rumen fluid containing the organisms, a suspension of organisms removed from rumen fluid by filtration or centrifugation, or pure laboratory cultures of rumen organisms. The rumen microorganisms are a mixture of numerous types of bacteria, protozoa, yeast and fungi. The activity of the rumen is generally attributed to certain anaerobic bacteria, the extensive protein and cellulose degradation and the synthesis of vitamins, fatty acids, etc. is apparently due to a widespread symbiotic relationship among all the many species present in the rumen. The fresh or sterile rumen fluid is added to the fermentation process since it contains growth factors necessary to the rumen microorganisms.

The rumen organisms necessary per gram of cottonseed meal may vary from 0.1% to 2% of dried rumen culture by weight of dried meal. The number initially may be from 0.5 billion to 2 billion microorganisms per milliliter of cottonseed slurry. The main consideration is to add sufficient rumen organisms to the slurry to initiate the anaerobic, cellulolytic fermentation process within a short time. Reducing agents are preferably but not necessarily added to speed the initiation of bacterial growth in the fermentation process. Based on the weight of the cottonseed, a minimum of about 5% of rumen fluid is preferably added. However, this quantity may be increased upward to 100% without injury to the process or final product.

The following example is given to illustrate how the invention may be practiced and is not intended to limit the scope of the invention.

*Example*

1,000 parts by weight of oil extracted cottonseed meal is moistened to the consistency of a slurry. 10 parts by weight of dried rumen culture is added to the slurry and thoroughly intermixed. 100 parts by weight of rumen fluid and 1/10 parts of cysteine hydrochloride are incorporated with further mixing.

The slurry is incubated for 48 hours at 40° C. and then press dried in cake form.

It is necessary to clearly differentiate the nutritive value of our final product from that claimed in the prior art. Previous methods have generally described the food value of a product thusly: "Increased feeding value," "increased food value," "a highly nutritious food," or "of high nutritive value." An example in parallel will clarify this matter. If a bushel of dried oats had intermixed with it some water-soluble strychnine crystals, obviously the oats would be toxic, unfit for feeding purposes, and of no nutritive value. If the strychnine were washed out with water and the oats dried with heat, the oats could then well be described as being a "highly nutritious food," or of "high nutritive value," or of "increased food value," regardless of whether or not the drying process lowers the nutritive value below that of fresh unadulterated oats.

By the previous processing methods used for detoxifying cottonseed meal, the inherent feeding value per se is not increased over what it was formerly. On the contrary, the feeding value has been decreased. By "feeding value" or "nutritive content" we mean the actual analytical value of protein, carbohydrate, fats, vitamins and so forth. In the process of this invention, the analytical level of nutrient constituents has actually been increased over the level of raw or untreated cottonseed meal. The microorganisms used in our fermentation process will produce as metabolic by-products, (1) vitamins, such as riboflavin, $B_6$, nicotinic acid, pantothenic acid, biotin, $B_1$, folic acid, inositol and vitamin K, (2) amino acids, (3) carbohydrates, (4) fatty acids.

Approximately 30% by weight of the untreated or raw cottonseed meal is cellulose or cellulosic materials. This large cellulose portion of the seed is ordinarily unavailable for nutritive purposes to monogastric animals due to their inability to digest cellulose. In the process herein described, we hydrolyze the cellulosic content of cottonseed to sugars, and other constituents readily utilized by all animals. Therefore, as a result of the bacterial synthesis of the above named ingredients and the bacterial breakdown of the cellulose, our new process increases the nutritional content of the cottonseed meal to a measurable extent over and above the nutritional value of both untreated seed and the meal produced by the former methods.

Obviously many modifications and variations of the invention as hereinbefore set forth may be made without departing from the spirit and scope thereof, and therefore only such limitations should be imposed as are indicated in the appended claims.

We claim:

1. A method of producing a detoxified cottonseed meal of improved nutritive content comprising: admixing sufficient rumen microorganisms to said cottonseed meal to initiate anaerobic fermentation; adding thereto an amount of rumen fluid; incubating the mixture so formed; and thereafter drying the resultant product.

2. A method of producing a detoxified cottonseed meal of improved nutritive content comprising: moistening the meal to the consistency of a heavy slurry; inoculating the slurry with rumen microorganisms numbering from about 0.5 billion to about 2 billion microorganisms per milliliter of slurry; adding rumen fluid thereto; incubating the mixture so formed at about 40° C. for from about 18 hours to about 48 hours; and thereafter drying the resultant product.

3. A method of producing a detoxified cottonseed meal of improved nutritive content comprising: moistening the meal to the consistency of a heavy slurry; inoculating the slurry with from about 0.1% to about 2% of dried rumen culture by weight of dried meal, admixing therewith from about 5% to about 100% rumen fluid; incubating the slurry for from about 18 hours to about 48 hours; and thereafter drying the resultant product.

4. An improved dry animal food suitable for consumption by non-ruminant animals comprising the product of the in vitro fermentative action of rumen microorganisms on cottonseed meal.

5. An improved dry animal feed suitable for consumption by non-ruminant animals comprising the in vitro fermentation product of cottonseed meal and from about 0.1% to about 2% dried rumen culture by weight of dried meal, said feed being substantially free of toxic gossypol due to the fermentative action of said rumen culture on said cottonseed meal.

6. An improved dry animal food suitable for consumption by non-ruminant animals comprising the in vitro fermentation product of cottonseed meal and rumen microorganisms, said feed being substantially free of toxic gossypol and of an increased nutritional content over untreated cottonseed meal due to the fermentative action of said rumen microorganisms on said cottonseed meal.

7. An improved dry animal food suitable for consumption by non-ruminant animals comprising the in vitro fermentation product of cottonseed meal and rumen microorganisms, said feed being substantially free of toxic gossypol and containing vitamins, amino acids, carbohydrates and fatty acids synthesized by the fermentative action of said rumen microorganisms on said cottonseed meal.

8. A method of detoxifying cottonseed meal comprising anaerobically fermenting said cottonseed meal in vitro with rumen microorganisms.

References Cited in the file of this patent

UNITED STATES PATENTS 2,560,830   Turner _____ July 17, 1951

FOREIGN PATENTS 470,433   Italy _____ Apr. 7, 1952